United States Patent
Charlton et al.

(12)

(10) Patent No.: US 7,526,379 B2
(45) Date of Patent: Apr. 28, 2009

(54) DETERMINING ELEVATION VALUES IN A GEOCODING SYSTEM

(75) Inventors: Berkley R. Charlton, Frederick, CO (US); David G. Takahashi, Boulder, CO (US); Bryan D. Sears, Longmont, CO (US); Freddie J. Bourland, II, Longmont, CO (US)

(73) Assignee: Pitney Bowes Software Inc., Lanham, MD (US)

( * ) Notice: Subject to any disclaimer, the term of this patent is extended or adjusted under 35 U.S.C. 154(b) by 200 days.

(21) Appl. No.: 11/647,963

(22) Filed: Dec. 28, 2006

(65) Prior Publication Data

US 2008/0162035 A1    Jul. 3, 2008

(51) Int. Cl.
*G01C 21/00* (2006.01)
(52) U.S. Cl. .................... 701/207; 701/300; 340/995.28
(58) Field of Classification Search ......... 701/207–208, 701/210, 212, 216, 217, 300; 340/990, 995.1, 340/995.28; 342/357.17
See application file for complete search history.

(56) References Cited

U.S. PATENT DOCUMENTS 5,848,373 A * 12/1998 DeLorme et al. ............ 701/200

* cited by examiner

*Primary Examiner*—Gertrude Arthur Jeanglaud
(74) *Attorney, Agent, or Firm*—Michael J. Cummings; Steven J. Shapiro; Angelo N. Chaclas

(57) ABSTRACT

A system and method of determining elevation values includes inputting a location into a geocoding system having a segment data set and determining the closest segment in the data set to the location. A data set of elevation data the closest segment is accessed and a determination is made of an elevation value for each of two elevation points associated with the closest segment. The elevation value of the location is determined based on interpolation of the location in relation to each the two elevation points and the elevation value of each of the two elevation points. The determined elevation value for said input location is output. The offset distance of the location from the closest segment may be determined and a slope applied to the offset distance to determine an elevation gain or loss for the location due to the offset distance of the location from the closest segment.

13 Claims, 3 Drawing Sheets

DETERMINING ELEVATION VALUES IN A GEOCODING SYSTEM

FIELD OF THE INVENTION

The present invention relates to determining elevation values for a specific location and, more particularly, to determining elevation values for a locations in a geocoding system.

BACKGROUND OF THE INVENTION

Various systems are currently employed to determine elevation values for a particular location, such as a specific street address. Such elevation values are valuable for evaluating risk decisions for insurance and real estate, including flood risk determination and coastal water risk, for enhanced driving and routing instructions, and for estimating drive times. Property and casualty insurance companies use elevation determining systems to understand the elevation of potential and insured properties, for example, properties along the U.S. Gulf Coast and Atlantic seaboard, to perform better hurricane risk assessment. Current solutions for determining elevation values require a latitude and longitude applied to large digital elevation model files, which is a slow and cumbersome process.

The particular location where an elevation value is needed may be established through existing geocoding systems, such as those where geocoding data sets are processed by a geocoding engine that utilizes a textual representation of a location. The engine matches the location, for example, an address, against a data set of geographic data and uses algorithms to determine the location of the input address. The engine returns the location as a coordinate (longitude-latitude pair) referred to as a geocode and, depending on the system, may also return a more complete and accurate address based on an address hygiene function. Geocoding data sets used for the above purposes include point level or parcel level geographic data sets and street segment line geographic data sets. While point or parcel level data sometimes include elevation value data for the address location, street segment data sets do not include elevation value data and various techniques are employed to obtain elevation values when needed.

The U.S. Geological Survey (USGS) and other data providers have compiled large digital elevation models for the United States. The compiled digital data models from the USGS are compiled using a 30-meter grid for the entire United States, where each 30-meter grid (approximately 100 feet by 100 feet) has the elevation value for the center point of the 30-meter square. The center point elevation value is provided to an accuracy of approximately 1/10 of a meter. This USGS digital elevation model is provided in a very large data set of elevation values, which is typically over forty gigabytes (40 GB) of data. Accordingly, to take a specific location and match it against the data set to obtain an elevation for the location, it is necessary to apply it against the entire massive data set.

In attempts to reduce the amount of data that has to be processed, the data set of elevation values is subdivided, for example, into one degree by one degree (1°×1°) sectors of latitude and longitude of 30-meter square elevation values. The user enters an address or location and a determination is made as to which one degree by one degree (1°×1°) sector the address falls into. Thereafter, that specific sector is searched for the elevation value. The specific portions of the digital elevation model areas or sectors vary in size with different solutions and different digital elevation models employed in various systems. This process is a two-step process. First the latitude and longitude of the particular address or location is employed to make a determination as to which sector of the elevation digital model includes the location. Thereafter, the specific sector is searched for the needed location elevation value. The solutions for implementing this two-step process are usually performed as a web service or service-oriented architecture that is performed on a pay-for-use basis. This requires that the data or files to be processed be sent outside the user organization. The data or files are sent to the service so that the data or file can be applied against the digital elevation data set to generate the needed elevation information for the specific locations, which are then returned to the user.

While the above solutions works satisfactorily for certain applications, they may be slow and cumbersome and/or may require that data or files, which may contain sensitive business or other confidential information such as the property address of interest to a particular insurance company, be sent outside of the user's organization. It is, thus, desirable to have an efficient and effective elevation solution that can be implemented internally on a user network, without undue operating burden to the user's computing system.

SUMMARY OF THE INVENTION

It is an object of the present invention to provide an improved method and system for establishing elevation values for various locations.

It is a further objection of the present invention to leverage existing elevation information to provide an enhanced system for establishing elevation values for various locations.

It is still another objective of the present invention to establish elevation values for specific locations employing interpolation techniques to existing data and applying the established elevation value to a geocoding system determined location.

It is yet another object of the present invention to pre-assign elevation data to segments used in geocoding to reduce the amount of data and time required for establishing elevation value assignment for a specific location.

In a geocoding system having a segment data set, a method of determining elevation values embodying the present invention includes the steps of inputting a location into the geocoding system and determining the closest segment to the location in the data set. A data set of elevation data for said closest segment is accessed and a determination is made of an elevation value for each of two elevation points associated with the closest segment. The elevation value of the location is determined based on interpolation of the location in relation to each of the two elevation points and the elevation value of each of the two elevation points. The elevation value for the input location is output.

In accordance with a feature of the present invention, in a geocoding system having a segment data set, a method of determining elevation values embodying the present invention includes the further steps of determining the offset distance of the location from the closest segment and applying a slope to the offset distance to determine an elevation gain or loss for the location due to the offset distance of the location from the closest segment.

BRIEF DESCRIPTION OF THE DRAWINGS

Reference is now made to the various figures wherein like reference numerals designate similar items in the various figures and in which.

DETAILED DESCRIPTION OF THE PREFERRED EMBODIMENT

Figure 1:
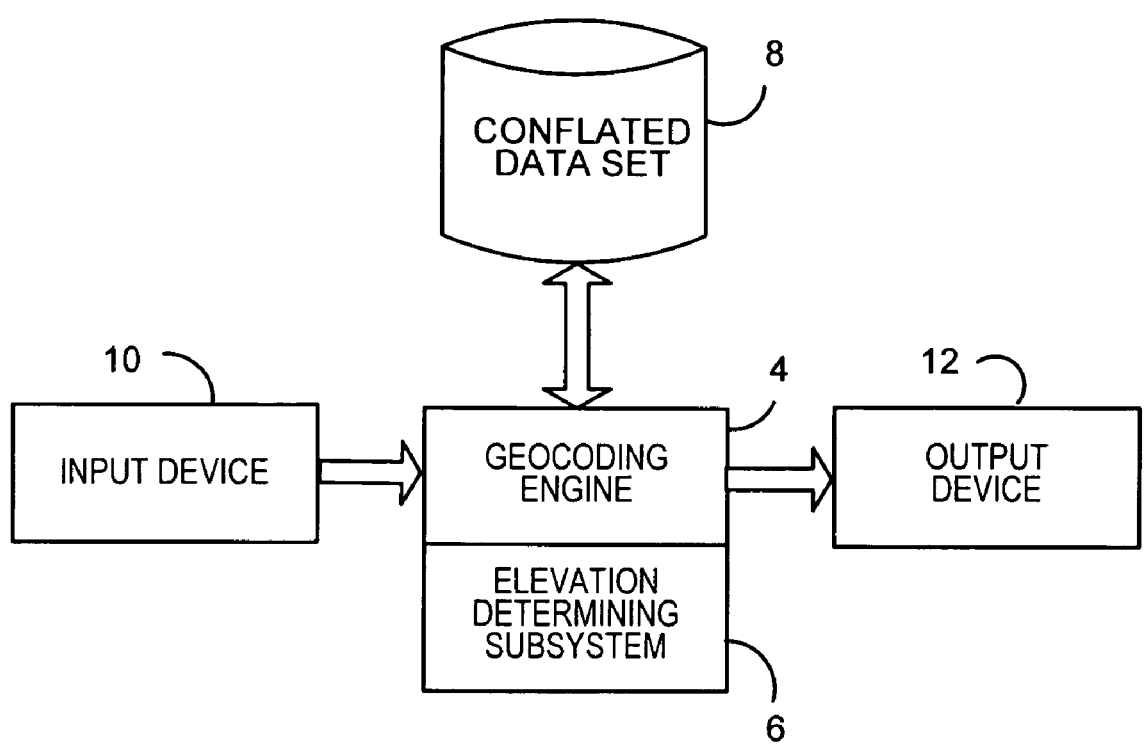
FIG. 1 is a block diagram of a geocoding system with an elevation value determining subsystem employing interpolation techniques on elevation data to establish elevation values for specific locations operating in accordance with the flowchart of FIG. 2 and embodying the present invention.

Reference is now made to the various figures and specifically to FIG. 1. The geocoding system 2 operates to identify a specific location for which elevation data is required. The geocoding system 2 employs a street segment data set in determining the specific coordinates (latitude and longitude) of the location. The location may be a specific point or a specific address such as a house address, or a feature such as an on-ramp for a free way or a highway. Street segment data sets are data sets where a line, usually a centerline, is provided, such as for a street. The street segment is comprised of one or more line segments (the straight portion of a street segment that is between two vertices). The street segment falls between vertices and/or end points. As used herein the term segment is a generic term that includes line segments and/or street segments.

Interpolation is employed to relate the segment line to a specific location to establish a single latitude and longitude for the location from a range of latitudes and longitudes. A street segment data set usually contains coordinates that describe the shape of each street and the range of house numbers found on each side of the street. The geocoding engine may compute the geocode by first interpolating where the input location (often a house number) exists within the street address range. The geocoding engine then applies this interpolated percentage to the street centerline coordinates to calculate the location. Finally, the engine offsets this location from the centerline to give an approximate structure location for the input location.

The geocoding system 2 employs a geocoding engine 4 that includes an elevation determining subsystem 6. The geocoding engine 4 is connected to operate with a conflated data set 8 to process a location input at input device 10 and to output an elevation value at output device 12. The conflated data set 8 includes a street segment data set with additional limited elevation data for each street and line segment in the data set. As will be explained in greater detail in connection with FIG. 3, each street segment has segment vertices with elevation data assigned to each of the vertices and a gradient value defining a slope, at a user-defined point along each of the line segments, that are a part of said street segment data set.

The geocoding system 2 pre-assigns limited elevation data to street segments used in geocoding. The elevation data that is assigned to the street segment vertices and may be obtained from the USGS elevation data set, or another similar elevation set with evenly spaced elevation points in a grid. This limited elevation data in the conflated data set 8 reduces the amount of data and time required for elevation value assignment in the geocoding system 2. The elevation determining subsystem 6 operates by employing interpolation techniques using the elevation data for the relevant street segment vertices to establish elevation values for a specific location, for example, a house.

The geocoding system 2 may also operate with a point data set to identify a specific location. The point data set may be part of the conflated data set 8 or may be in a separate data set accessed by the geocoding engine 4. Where the specific location is obtained from a point data set, the point data set may have associated elevation data. Where the point data set does not have associated elevation data, the system described in connection with FIGS. 1-3 may be employed to determine the elevation data for the specific location. Where no elevation value is available, as would also usually be the case with a location obtained from a street segment data set, the elevation determining subsystem 6 computes an elevation value for the location. This is achieved by employing interpolation techniques, using the elevation data at the street segment vertices. By means of interpolation, elevation values are established for a specific location on or offset from the street segment. The elevation data is in the form of elevation values at the center point of virtual grid cells from an evenly spaced digital elevation model of virtual grid cells. Each vertex of the street segment will receive the value of the virtual grid cell that it falls within, as is shown in FIG. 3. The elevation values assigned to the vertices can be store employing a standard delta encoding scheme.

Each line segment (the straight portion of a street segment that is between two vertices), as is shown in FIG. 3, will receive two calculated gradient values, each gradient value being assigned to opposite sides of the street. Each gradient value will be obtained by using a point along the line segment (generally the center point of the segment), and extending a virtual line perpendicular to the line segment a preset distance. The preset distance as well as the number and location of the gradient points along the line segment are a matter of design choice.

The end-points of the perpendicular virtual lines will receive elevation values based on the virtual elevation grid cell in which they fall within, and a gradient value will be assigned for each side of the line segment by calculating the slope of the virtual line segment. The calculated slope will be assigned to the particular line segment for which it was calculated. The slope can be positive or negative depending on the nature of the change in elevation relative to the segment involved.

The number and size of the virtual grid cells employed and the location and type of elevation points (actual elevation value of the elevation point, average elevation value for the virtual grid cell, elevation values and distance of the perpendicular virtual lines, etc.) are matters of design choice. In a more limited implementation, the single closest elevation value of each street segment vertex may be employed. Although the street segment vertices are typically the two end points of each street segment, the vertices can be located in other predetermined points along a street segment where desired and associated with elevation data.

After geographic coordinates are assigned to a location along a street segment by the geocoding system 2, estimated elevation data for this location (coordinates) is computed for the location by the elevation determining subsystem 6. This is implemented by interpolating the elevation values based on the distance of the location to nearby elevation values on elevation points associated with the street segment. The interpolation process will also accommodate offset of the geocoded location from a line segment on the street where the coordinates are a point, such as for a house which is generally offset a certain distance from the street segment. Because the elevation determining subsystem 6 does not require a large and cumbersome data set to be used for determining elevations, the elevation data set can be a data set that is distributed to various users of the geocoding system 2 for operation on the user's computer system. While the elevation data may be incorporated into segment data sets such as street segment data sets; other arrangements can be implemented with, for example, linkage to the various street segment vertices in a street segment data set without elevation value data.

Figure 2:
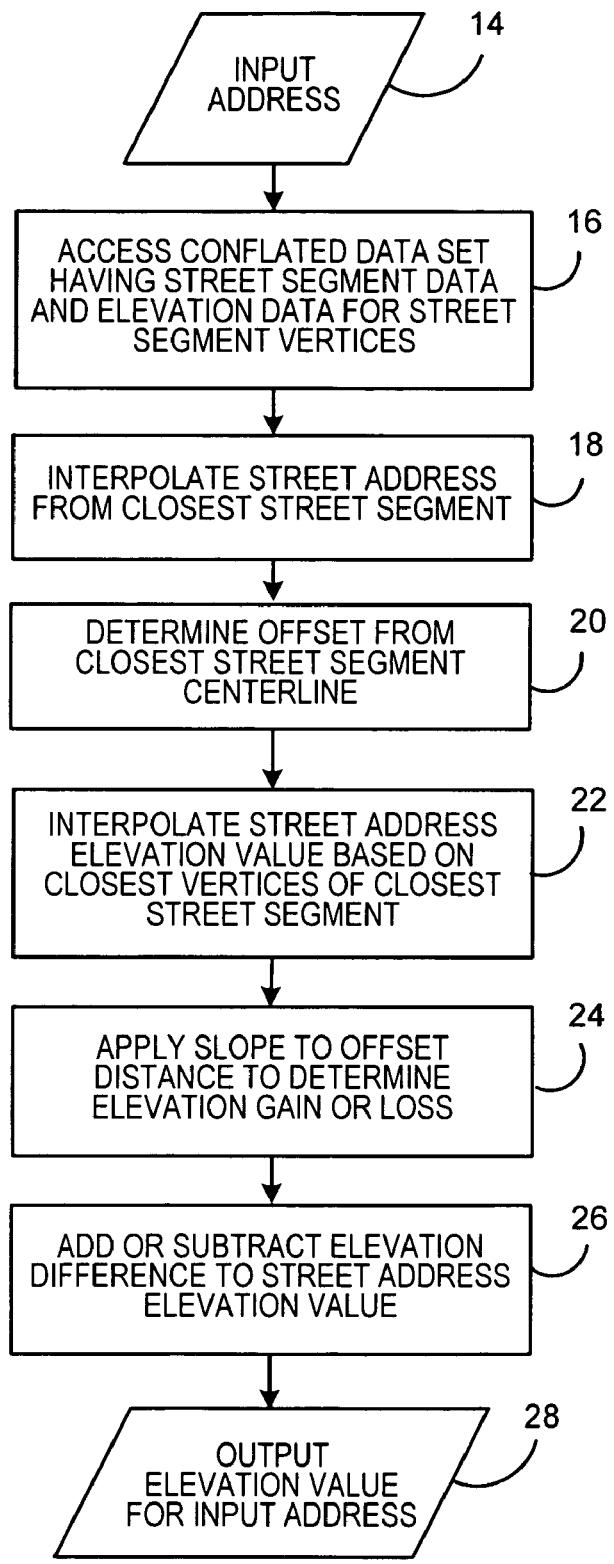
FIG. 2 is a flowchart of the operation of the geocoding system and elevation determining subsystem shown in FIG. 1; and, FIG. 3 is a chart of elevation data at the vertices of a street segment illustrating an example of the operation of the geocoding system and elevation determining subsystem of FIG. 1 in accordance with the flow chart of FIG. 2.
Figure 3:
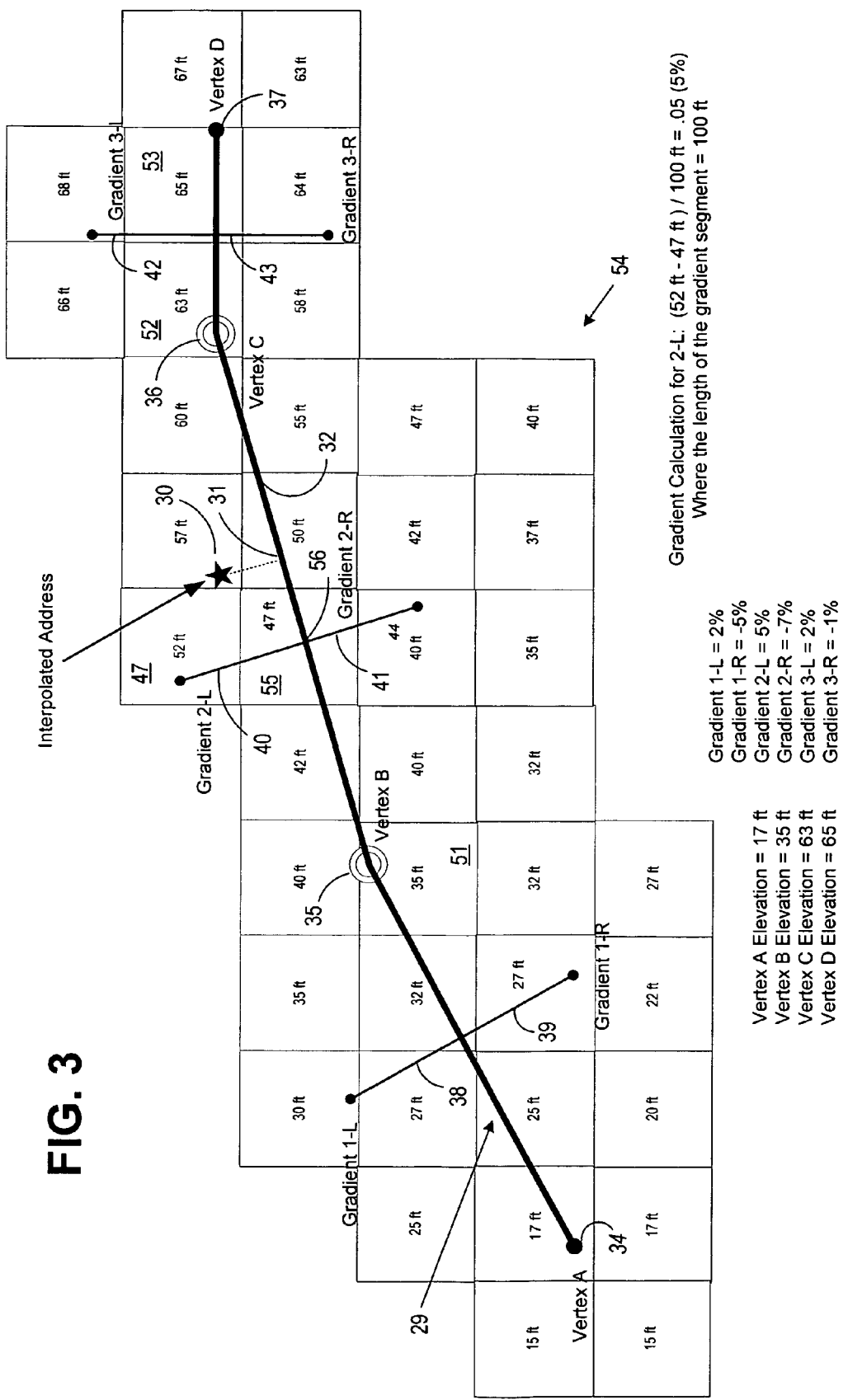

Reference is now made to FIG. 2. An address is input at block 14. The conflated data set 8 is accessed at block 16. The conflated data set 8, as previously noted, has street segment data, elevation data for the street segment vertices, and a gradient value (slope) for each side of the line segments that are part of the street segment. The conflated data set 8 may, if desired, additionally have point data set information. In such a case, the point data set may have an associated elevation value for the particular location, in which case the elevation value from the point data set would be employed and interpolation would not be part of the retrieval of the elevation value for an input address contained in the point data set.

Where the data being employed is street segment data, the street segment data is retrieved at block 18. The location is interpolated to obtain the latitude and longitude and elevation of the location based on the closest retrieved line segment. A determination is then made at block 20 of the offset of the location from the center line of the closest street segment.

At block 22, an elevation value is determined by using the nearest two vertices of the closest street segment line which are interpolated to obtain the elevation value for the location input into the system at block 14. This elevation value for the location of the input address can be further modified to take into account the determined offset distance of the location from the closest street segment line. Thus, at block 24 a slope is applied to the offset distance of the location to determine any elevation gain or loss for the elevation value due to the offset. At block 26, any elevation difference is added or subtracted to the street address elevation value. The elevation value for input address is output at block 28.

Reference is now made to FIG. 3. Each vertex of a street segment is pre-assigned an actual elevation value and a gradient value is assigned to each side of each of the line segments that are a part of the street segment. The distances may be visualized in virtual grids, which are each in the order of a preset grid size, for example a 30×30 meter grid as in the USGS data set. This accommodates the offset of a location from a line segment. The typical house offset from the street center line may be about 25-50 feet and is usually for each locale a data entry or batch entry into the geocoding system 2.

A location 30 is adjacent a line segment 32 of street segment 29, with the street segment endpoints 34 and 37. Location 30 has been offset 50 feet perpendicularly from line segment 32 starting at point 31. The line segment 32 has two vertices which form the endpoints of line segment 32; a first vertex B at 35 and a second vertex C at 36. A series of virtual grids surround the line segment 32 which provide elevation values used for the calculations of elevation and slope. Thus, at Vertex B at 35, the elevation of grid 51 is 35 feet, at vertex C at 36 the elevation of grid 52 is 63 feet, at the endpoint of Gradient 2-L of line 40 the elevation of grid 47 is 52 feet, and at the endpoint of Gradient 2-R of line 41 the elevation of grid 48 is 40 feet. The elevation values for vertices A and B, Gradients 2-L and 2-R and the Line Segment 32 are stored as part of the conflated data set 8. These data can, as previously noted, be obtained from elevation data sets such as those provided by the USGS. It should be noted that the larger virtual grid system shown generally at 54 includes numerous virtual grid areas where elevation values are not loaded into the conflated data set 8. Thus, only limited elevation data is provided for each line and street segment in the conflated data set 8.

For the Location 31 on line segment 32, the closest adjacent vertices and their associated virtual grids are vertex B at 35, nearest to virtual grid 51 and vertex C at 36 which is nearest to virtual grid 52. Where location 31, is sixty percent (60%) along the street segment from vertex A, the elevation value would be determined by taking 60% of the difference between the elevation value at 51 (35 feet above sea level) and the elevation at 52 (63 feet above sea level) and adding that to the elevation value at 51. [(Elevation Value at 52−Elevation Value at 51)×60%+(Elevation value at 51)=Elevation Value for location 30]. Using the actual values from FIG. 3 the interpolation for the non-offset location of 31 is calculated as follows: (63 feet−35 feet)×60%+(35 feet)=51.8 feet. Thus, 60% of the difference is 16.8 feet (60% of 28). This may be rounded to 17 feet and added to the elevation value at 51 of 35 feet, providing an interpolated rounded elevation value for location 31 of 52 feet above sea level or, without rounding, 51.8 feet above sea level.

As it is typical for an interpolated street address to be offset from the street by a predetermined distance, location 30 has been offset from line segment 32 by 50 feet along a virtual line 57 perpendicular to line segment 32 at location 31. Gradient 2-L along line 40 has been stored as part of conflated data set 8. The Gradient 2-L has been calculated by extending a point at a user-defined distance perpendicular to location 56 which is at the midpoint of line segment 32. The point of intersection of the gradient to the line segment at location 56 may be defined by user preference. In this example, Gradient 2-L has been extended 100 feet, with the endpoint of Gradient 2-L being adjacent to virtual grid 47. The value of Gradient 2-L along line 40 would be calculated by using the elevation value of Grid 47 (52 feet above sea level) and subtracting from it the elevation value of Grid 55 (47 feet above sea level), divided by the distance of Gradient 2-L of line 40 (100 feet). [(Elevation value at 47−Elevation value at 56)/distance of 40). Using the actual values of FIG. 3, the slope of Gradient 2-L may be calculated as follows: [(52 feet−47 feet)/100 feet]=0.05

For location 30, the elevation value is calculated by multiplying the value of Gradient 2-L along line 40 (0.05) with the distance of the offset of the interpolated address (50 feet) and adding this result to the value of the interpolated elevation at location 31 (51.8 feet). [(Value (slope) of Line 40×Value of Virtual Line (Offset) 57)+Value of Location 31]. Using the actual values of FIG. 3, the elevation value of the offset Interpolated Address at 30 may be calculated as follows: [(0.05*50 feet)+51.8 feet=54.3 feet. This may be rounded to 54 feet. The slope as previously noted may be positive or negative. If the slope is negative, it will result in a drop in elevation. If the slope is positive, it will result in an increase in elevation.

The elevation values for the various vertices (vertices A, B, C, and D) shown in FIG. 3 are listed. These elevation values are obtained from the elevation value of the virtual grid in which they are situated. In like manner, the slopes of the various gradients (Gradient 1-L, 1-R, 2-L, 2-R, 3-L, and 3-R) are listed for the three line segments of the street segment. Each of these gradients (slopes) is determine employing the same type calculation as is shown for Gradient 2-L.

While the present invention has been described in connection with what is presently considered to be the most practical and preferred embodiments, it is to be understood that the invention is not limited to the disclosed embodiment, but, on the contrary, is intended to cover various modifications and equivalent arrangements included within the spirit and scope of the appended claims.

What is claimed is:

1. A method of determining elevation values using a geocoding system having a segment data set, comprising the steps of:
   inputting a location into said geocoding system;
   determining a closest segment in said data set to said location;
   accessing a data set of elevation data for said closest segment;
   determining segment elevation values for each of two segment elevation points associated with said closest segment;
   determining an elevation value of said location based on interpolation of said location in relation to each said two segment elevation points and said segment elevation values; and,
   outputting said elevation value for said input location.

2. A method of determining elevation values using a geocoding system having a segment data set as defined in claim 1, comprising the further steps of: determining an offset distance of said location from said closest segment and applying a slope to said offset distance to determine an elevation gain or loss for said location due to said offset distance of said location from said closest segment.

3. A method of determining elevation values using a geocoding system having a segment data set as defined in claim 2 wherein said segment data set is a street segment data set and said closest segment is a closest line segment of a closest street segment to said location.

4. A method of determining elevation values using a geocoding system having a segment data set as defined in claim 3 wherein said offset distance is a distance of said location to said closest line segment.

5. A method of determining elevation values using a geocoding system having a segment data set as defined in claim 4 wherein said elevation value output for said input location is a sum of said elevation value of said location based on interpolation and said elevation gain or loss for said location due to said offset distance of said location from said closest segment.

6. A method of determining elevation values using a geocoding system having a segment data set as defined in claim 1 wherein said closest segment has two vertices and wherein a first of said two segment elevation points is associated with a first of said two vertices and a second of said two segment elevation points is associated with a second of said two vertices.

7. A method of determining elevation values using a geocoding system having a segment data set as defined in claim 6 wherein said segment data set is a street segment data set and said closest segment is a closest line segment of a closest street segment to said location and wherein said first of said two vertices is at a first end of said closest line segment and said second of said two vertices is at a second end of said closest line segment.

8. A method of determining elevation values using a geocoding system having a segment data set as defined in claim 7, comprising further steps of: determining an offset distance of said location from said closest line segment and applying a slope to said offset distance to determine an elevation gain or loss for said location due to said offset distance of said location from said closest line segment.

9. A method of determining elevation values using a geocoding system having a segment data set as defined in claim 8 wherein said elevation value output for said input location is a sum of said elevation value of said location based on interpolation and said elevation gain or loss for said location due to said offset distance of said location from said closest segment.

10. A method of determining elevation values using a geocoding system having a segment data set as defined in claim 9 wherein a first slope is determined for a first side of said closest line segment and a second slope is determined for a second side of said closest line segment.

11. A method of determining elevation values using a geocoding system having a segment data set as defined in claim 10 wherein said location input into said geocoding system is on said first side of said closest line segment and said slope applied to said offset distance is said first slope.

12. In a geocoding system having a segment data set, an elevation determining subsystem comprising:
    means for inputting a location into said geocoding system;
    means for determining a closest segment in said segment data set to said location;
    means for accessing a data set of elevation data for said closest segment;
    means for determining a segment elevation value for each of two segment elevation points associated with said closest segment;
    means for determining the elevation value of said location based on interpolation of said location in relation to each said two segment elevation points and said segment elevation value of each of said two segment elevation points; and,
    means for outputting said elevation value for said input location.

13. In a geocoding system as defined in claim 12 an elevation determining subsystem further comprising:
    means for determining an offset distance of said location from said closest segment; and,
    means for applying a slope to said offset distance to determine an elevation gain or loss for said location due to said offset distance of said location from said closest segment.

* * * * *